Aug. 1, 1939.  R. E. RILEY  2,167,999
METHOD OF MAKING A SPONGE RUBBER ARTICLE
Filed May 1, 1936
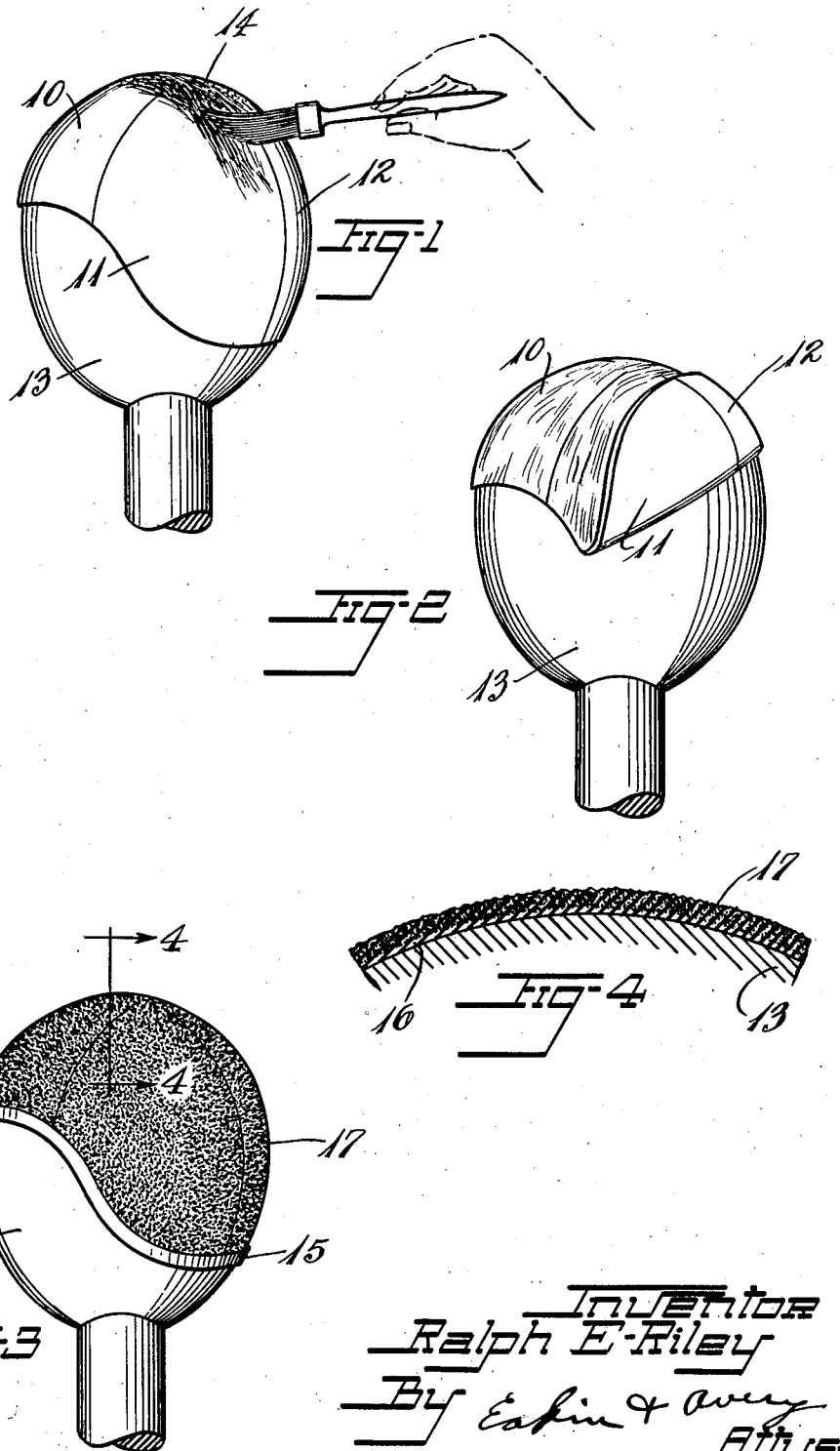
Inventor
Ralph E. Riley
By Eakin & Avery
Attys.

Patented Aug. 1, 1939

2,167,999

UNITED STATES PATENT OFFICE 2,167,999

METHOD OF MAKING A SPONGE RUBBER ARTICLE

Ralph E. Riley, Akron, Ohio, assignor to The B. F. Goodrich Company, New York, N. Y., a corporation of New York Application May 1, 1936, Serial No. 77,333

3 Claims. (Cl. 18—53)

This invention relates to methods of making sponge rubber articles.

Articles of soft sponge rubber are ordinarily made by incorporating in an unvulcanized rubber composition a blowing agent adapted to release a gas at elevated temperatures such as are used in vulcanizing the rubber composition. The manufacture of such rubber compositions and the vulcanization thereof is well understood in the art. During vulcanization the gas eliminated forms bubbles in the composition and the resulting article is substantially equally cellular in structure except for a thin skin at its surface.

The principal objects of the present invention are to provide control of the cellular structure of an article formed from a single rubber composition, and to provide economy, simplicity, and efficiency of procedure.

Other objects will appear from the following description and the accompanying drawing.

Of the drawing:

Fig. 1 is a perspective view showing the preferred method of treating the unvulcanized article to control the cell formation, the view showing by way of example a bathing cap upon a supporting form.

Fig. 2 is a similar view showing the step of reversing the article on its form.

Fig. 3 is a similar view of the article after vulcanization.

Fig. 4 is a cross-sectional view of the finished article after vulcanization has taken place, the section being taken on line 4—4 of Fig. 3.

Referring to the drawing, the method briefly comprises forming an article of unvulcanized rubber containing a blowing agent suitable for forming sponge rubber, treating a surface of the sponge rubber composition to substantially prevent blowing thereof, and then vulcanizing the rubber composition.

The preferred method of preventing the blowing of a surface of the article is by locally vulcanizing such surface at such a temperature as not to release the gas from the blower contained in the rubber composition. This may readily be accomplished by treating such surface with sulfur chloride at substantially room temperature. The sulfur chloride may be applied either as a solution in a solvent or as a gas.

As an example of the method of procedure, sheets of unvulcanized sponge rubber composition 10, 11, 12 may be assembled to form a cap upon a suitable form 13. The outer surface of the article is then painted with a solution of sulfur chloride in carbon bisulphide, benzine, gasoline, carbon tetrachloride, or other solvent as indicated at 14. The surface to which the sulfur chloride is applied becomes vulcanized without release of gas from the blower.

If desired, the article may then be stripped from the form and reversed thereon as illustrated in Fig. 2 to expose its unvulcanized surface. A trimming strip such as that shown at 15 in Fig. 3 may be applied thereto if desired.

The article on the form is then placed in a vulcanizer in an atmosphere of steam or other heated gas at such temperature as to vulcanize the rubber and release the gas from the blowing agent.

The prevulcanization of the surface of the article substantially prevents any blowing thereof so that the finished article is provided with a noncellular face layer 16 on one of its faces and a cellular layer 17 of greater thickness integral therewith.

Where the article is reversed upon its form after the treatment with sulfur chloride, the prevulcanized surface layer is supported smoothly by the form and presents a smooth substantially impervious lining in the finished article.

I claim:

1. The method of making a contoured article which comprises fitting together portions of unvulcanized sheet sponge rubber material, toughening the article locally against blowing and strengthening the seams against separation by partially vulcanizing one face of the fitted portions without substantial expansion of the blowing agent therein, placing the article over a contoured form with its partially vulcanized surface in contact with the form, and then vulcanizing the article with expansion of the blowing agent.

2. The method of making a contoured article which comprises fitting together portions of unvulcanized sheet sponge rubber material about a contoured form to provide a contoured article, toughening the article locally against blowing and strengthening the seams against separation by partially vulcanizing the exposed face of the fitted portions without substantial expansion of the blowing agent therein, reversing the article and placing it on the form with its partially vulcanized surface against the form, and then vulcanizing the article with expansion of the blowing agent at an elevated temperature.

3. The method of making a rubber article which comprises fitting together portions of sheet sponge rubber material, toughening the article locally against blowing and strengthening the same against separation by subjecting one face of the fitted portions to a vulcanizing operation without substantial expansion of the blowing agent therein, and then vulcanizing the article with expansion of the blowing agent.

RALPH E. RILEY.

CERTIFICATE OF CORRECTION.

Patent No. 2,167,999.  August 1, 1939.

RALPH E. RILEY.

It is hereby certified that error appears in the printed specification of the above numbered patent requiring correction as follows: Second column, line 51, claim 3, for the word "same" read seams; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.